US012654203B2

(12) United States Patent
Silvestri

(10) Patent No.: US 12,654,203 B2
(45) Date of Patent: Jun. 16, 2026

(54) COMPACT DEVICE FOR SORTING BULK SOLID PRODUCTS

(71) Applicant: DEMETRA S.R.L., Piansano (IT)

(72) Inventor: Marco Silvestri, Piansano (IT)

( * ) Notice: Subject to any disclaimer, the term of this patent is extended or adjusted under 35 U.S.C. 154(b) by 0 days.

(21) Appl. No.: 19/120,782

(22) PCT Filed: Sep. 27, 2023

(86) PCT No.: PCT/IB2023/059602
§ 371 (c)(1),
(2) Date: Apr. 13, 2025

(87) PCT Pub. No.: WO2024/084312
PCT Pub. Date: Apr. 25, 2024

(65) Prior Publication Data

US 2026/0102790 A1 Apr. 16, 2026

(30) Foreign Application Priority Data

Oct. 17, 2022 (IT) ........................ 102022000021306

(51) Int. Cl.

| | |
|---|---|
| ***B07B 9/02*** | (2006.01) |
| ***B07B 4/08*** | (2006.01) |
| ***B07B 11/02*** | (2006.01) |
| ***B07B 11/06*** | (2006.01) |

(52) U.S. Cl.
CPC .................. *B07B 9/02* (2013.01); *B07B 4/08* (2013.01); *B07B 11/02* (2013.01); *B07B 11/06* (2013.01)

(58) Field of Classification Search
CPC .. B07B 9/02; B07B 4/08; B07B 11/02; B07B 11/06
See application file for complete search history.

(56) References Cited

U.S. PATENT DOCUMENTS 4,242,197 A * 12/1980 Voelskow ................. B03B 9/06
209/39
2022/0111419 A1 4/2022 Perez

FOREIGN PATENT DOCUMENTS

| | | |
|---|---|---|
| EP | 3409383 | 12/2018 |
| KR | 101966788 | 4/2019 |
| WO | 2019231248 | 12/2019 |

OTHER PUBLICATIONS

Wikipedia, “Fliehktaftabscheider”, Section: “Aufbau”, Subsection: “Multizyklon”, de.wikipedia.org (Note: The International Search Report cited a date of Oct. 3, 2022).

* cited by examiner

*Primary Examiner* — Jacob S. Scott
*Assistant Examiner* — Miraj T. Patel
(74) *Attorney, Agent, or Firm* — Themis Law

(57) ABSTRACT

A device for the sorting a mixture of solid products includes an inlet for the mixture to be sorted, a first sorting area with a sifter configured to pre-sort the mixture to be sorted, a second sorting area subsequent to the first, having an airflow generation system, and a plurality of conveyors. The airflow generation system is dimensioned to generate an air flow that impacts and directs the pre-sorted mixture into the conveyors. The device further includes a plurality of outlets for the sorted mixture, each connected to a conveyor to dispense, in a differentiated manner, the pure and impure parts; a line for advancing the mixture, which extends, in a continuous manner, from the inlet to the plurality of outlets, passing through the first and the second sorting area; and an air filtering system with a plurality of multi-cyclon filters configured to filter the air flow.

9 Claims, 4 Drawing Sheets

COMPACT DEVICE FOR SORTING BULK SOLID PRODUCTS

FIELD OF THE INVENTION

The present invention generally relates to the technical field of machines for the food processing industry and in particular it relates to a compact device for the sorting solid loose products.

Definition

In the present document, the expression “pure part” and derivatives referring to a mixture of a solid product, is used to indicate the useful fraction of the latter.

In the present document, the expression “impure part” and derivatives referring to a mixture of a solid product, is used to indicate the waste fraction of the latter.

STATE OF THE ART

The use of sorting machines for separating the pure part from the impure part, especially in the case of solid loose food products, such as for example seeds, cereals or the like, is widely known.

Among these, there are known sorting machines which exploit the generation of a vibrating motion through a vibro-sifting machines or the like to carry out the aforementioned separation.

At times, the latter are also used combined with suitable suctioning systems, for example suction hoods, for suctioning the lighter fraction, for example dust, soil or particulate, present in the mixture to be sorted.

There are also known aerodynamic sorting machines which carry out the aforementioned separation by generating an air flow.

Actually, the latter is capable of separating the pure part from the impure part depending on their specific weight.

Usually, such separators require to be used combined or in several cycles to obtain an output mixture with a high sorting efficiency.

As a result, the sorting times are particularly long, with significant impact on the overall productivity.

Furthermore, the possible need to combine several devices to obtain a high sorting efficiency significantly increases the overall dimensions and especially the costs relating to management and maintenance.

SUMMARY OF THE INVENTION

An object of the present invention is to at least partly overcome the drawbacks outlined above, by providing a particularly compact sorting device.

A further object of the invention is to provide a high-performing sorting device.

A further object of the invention is to provide a sorting device that is small in size.

A further object of the invention is to provide a sorting device adapted to minimise the sorting times.

A further object of the invention is to provide a sorting device that is cost-effective.

These and other objects which will be more apparent hereinafter, are attained by a sorting device as described, illustrated and/or claimed herein.

The dependent claims describe advantageous embodiments of the invention.

BRIEF DESCRIPTION OF THE DRAWINGS

Further characteristics and advantages of the invention will be more apparent in the light of the detailed description of the main embodiments, shown by way of non-limiting example with reference to the attached drawings, wherein.

DETAILED DESCRIPTION OF A PREFERRED EMBODIMENT OF THE INVENTION

With reference to the aforementioned figures, herein described is a device 1 for sorting solid loose products, such as for example food produce products such as for example seeds, cereals, feed and the like.

In the specific case, the solid loose products to be sorted may form a mixture: the latter in turn may comprise a pure part and an impure part to be separated.

Commonly, the pure part and the impure part may, in turn, be formed by a plurality of sub-fractions with different size, shape and specific weight.

Although in the description hereinafter reference will be made to a mixture which comprises a single pure part and a single impure part, it is however clear that there may also be provided for a mixture with a plurality of pure parts and/or a plurality of impure parts, without departing from the scope of protection of the attached claims.

Generally, the device 1 may provide for a substantially closed support structure 100 with one or more inlets IN for the mixture to be sorted, preferably a single inlet IN.

Therefore, the mixture may be loaded at the latter manually by an operator or automatically, for example using metering devices.

The device 1 may provide for a suitable line LA for the advancement of the mixture which extends from the inlet IN up to a plurality of unloading areas OUT1, OUT2, . . . for the sorted mixture.

Figure 1:
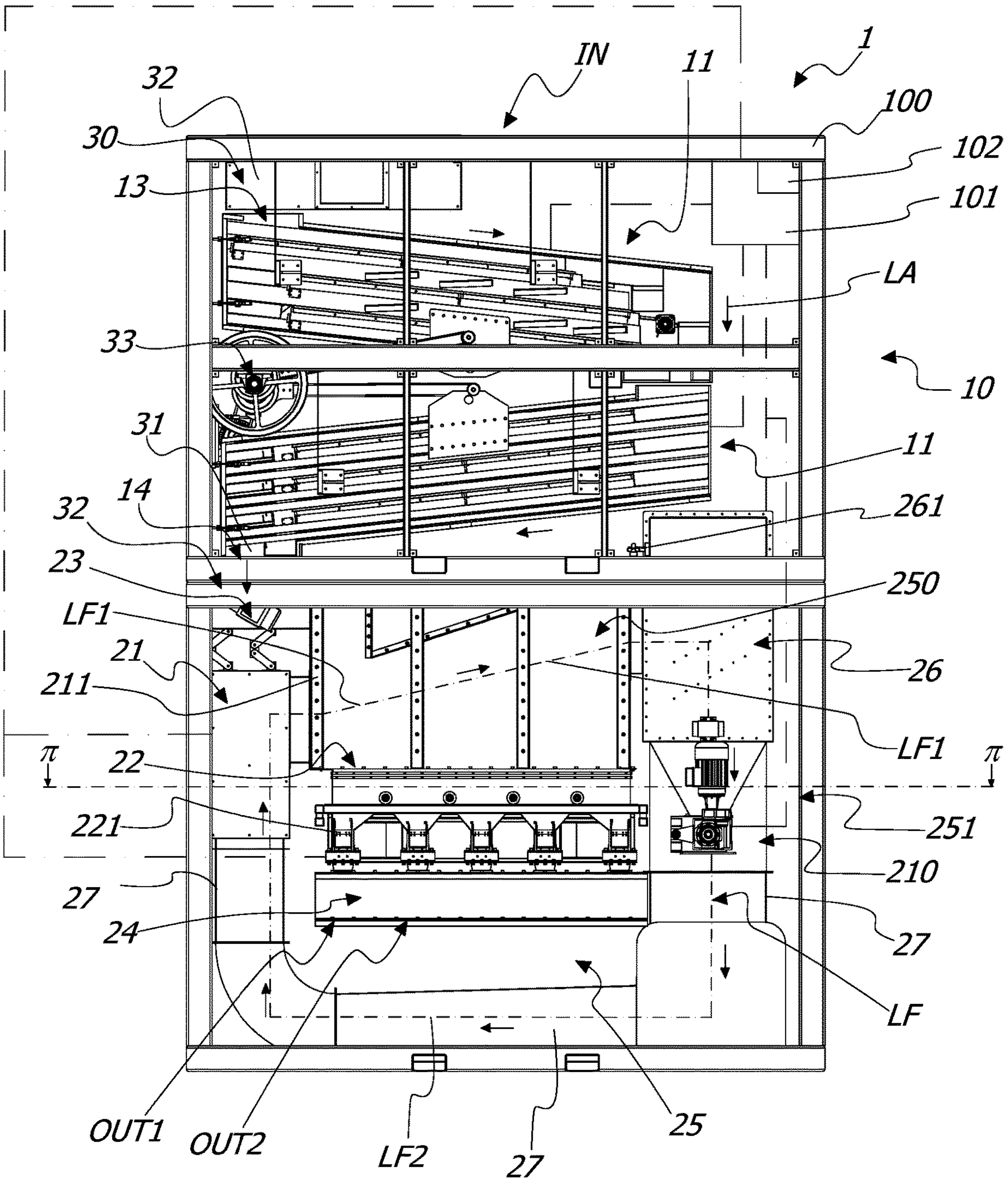
FIG. 1 shows a front view of the device 1.
Figure 2:
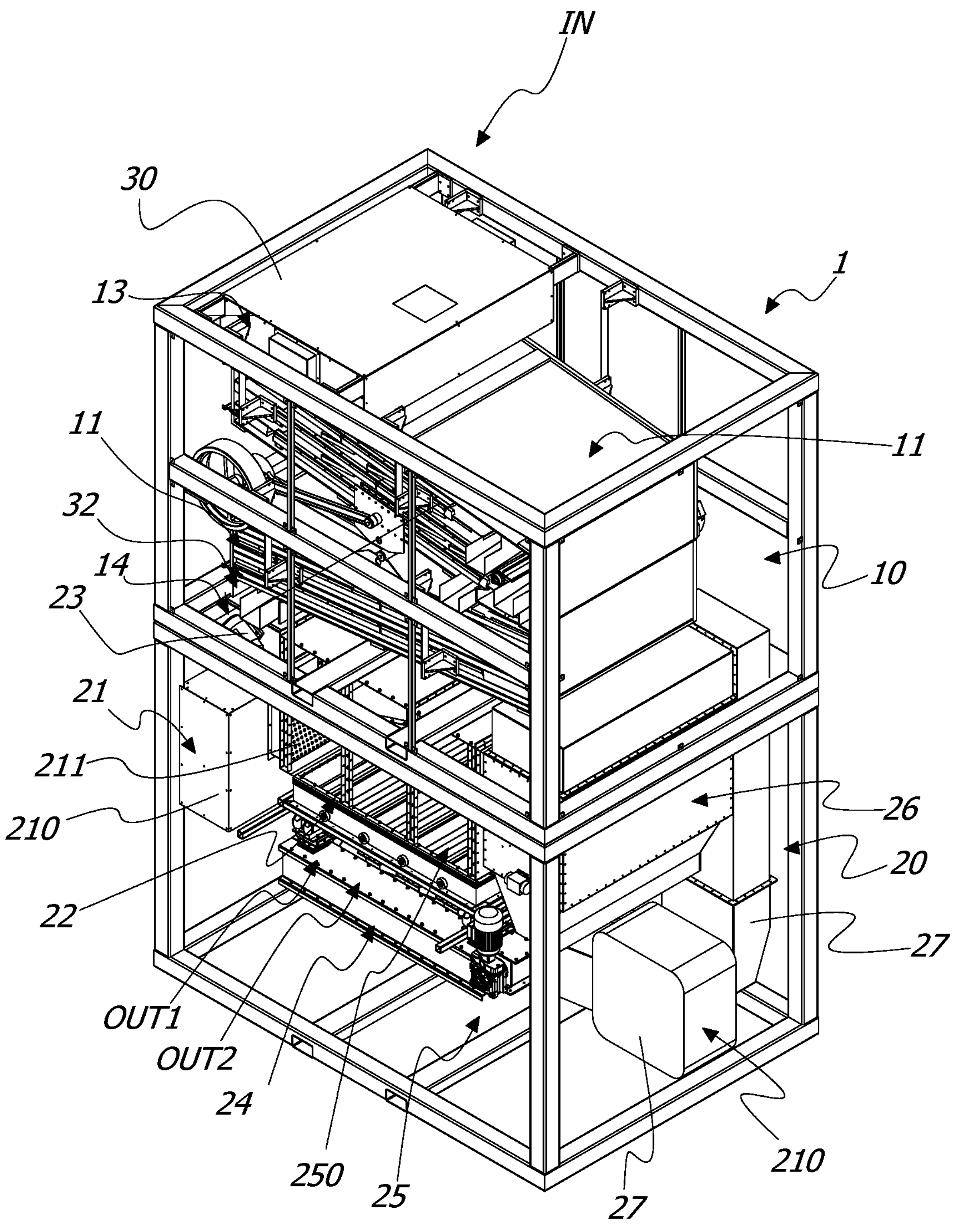
FIG. 2 shows an axonometric view of the device 1.
Figure 3:
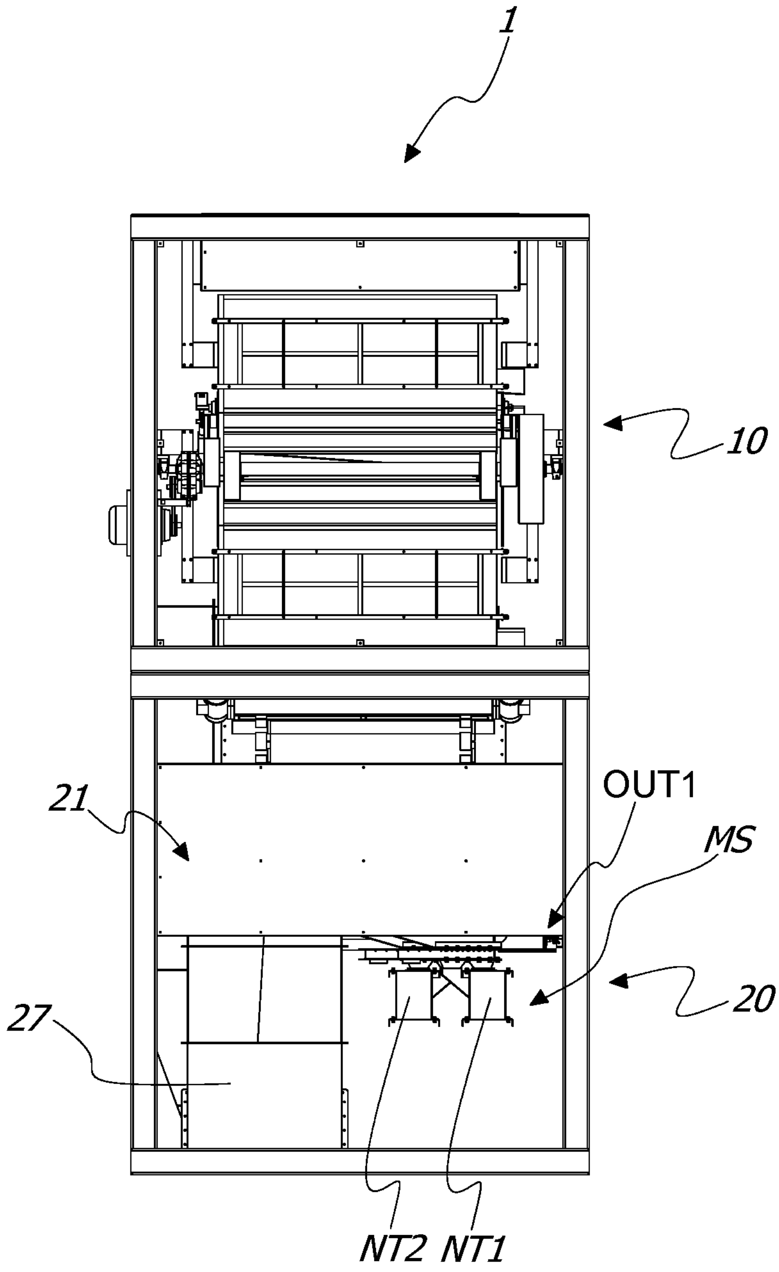
FIG. 3 shows a lateral view of the device 1.

Therefore, the mixture may follow a predetermined path defined by the aforementioned advancement line LA and pass through a first and a second sorting area 10, 20 which are consecutive, as particularly shown in FIGS. 1, 2 and 3.

Specifically, the first sorting area 10 may be operatively connected with the inlet IN and configured to pre-sort the mixture.

This means that in the first sorting area 10 the mixture may be pre-treated and cleaned so as to at least preliminarily reduce the presence of impure part therein.

This pre-treatment may advantageously make the sorting operation in the second sorting area 20 easier and quicker.

In particular, the first sorting area 10 may include an inlet 13 for the mixture to be pre-sorted and an outlet 14 for the pre-sorted mixture, as particularly shown in FIGS. 1 and 2.

To pre-sort the mixture, there may be provided for one or more sifters 11 suitably arranged along the aforementioned advancement line LA and configured to reduce the presence of the impure part therein.

According to a preferred but non-exclusive embodiment of the invention, there may be provided for a first and a second sifter assembly 11 that are mutually spaced and arranged sequentially.

The first group may comprise a plurality of sifters 11, for example three sifters 11, positioned in series one with respect to the other, so as to allow a first sieving of the mixture depending on the size and the weight of the parts forming the latter.

The second group may receive—in input—the mixture sieved by the first sifter assembly 11 and it comprises a plurality of sifters 11, for example three sifters 11, this time positioned parallel one with respect to the other to carry out a second sieving.

In this case, given that the sifters 11 of the second group are identical, the mixture may be divided into equal parts by gravity.

Even a suitable eccentric mechanism 33 suitably projected to act on the two sifter assemblies 11 to allow the mixture to advance along the advancement line LA may also be provided for interposed between the first and the second sifter assembly 11.

Furthermore, in order to guarantee a better distribution of the mixture there may be provided for first vibrating means 30 interposed between the inlet IN and the inlet 13.

The latter may for example be in the form of a vibrating belt 32 configured to uniform the mixture in input on the first sifter assembly 11.

Preferably, the device 1 may also be provided with suitable suctioning means positioned at the vibrating belt 32, designated to suction the dust and lighter particles.

In an entirely similar manner, there may also be provided for second vibrating means 31, for example in the form of a vibrating belt/platform 32, arranged at the outlet 14.

In this case, the vibrating belt may be configured to allow the intervalled advancement of the pre-sorted mixture exiting from the second sifter assembly 11 towards the second sorting area 20.

The operations for sieving and finishing the mixture, will allow to obtain a pre-sorted mixture entering the second sorting area 20.

Therefore, the pre-sorted mixture may be characterised by a small percentage of impure part with respect to the mixture entering the device 1.

At this point, the pre-sorted mixture may therefore advance along the advancement line LA towards the second sorting area 20 where it may therefore be sorted.

Similarly, the latter may provide for an inlet 23 connected with the outlet 14 of the first sorting area 10 and an outlet 24.

The contiguity between the outlet 14 and the inlet 23 may therefore show to be particularly advantageous, given that it may allow to significantly increase the compactness of the device 1, actually allowing operative continuity between the pre-sorting operation carried out in the first sorting area 10 and the sorting operation carried out in the second sorting area 20.

In particular, the second sorting area 20 may comprise a partially airtight chamber 25 which can in turn be divided into a portion 250 and into a portion 251, as particularly shown in FIG. 1.

Specifically, the chamber 25 may be a fluid-tight chamber in the device 1, but it may include an opening for the connection with an environment external to the latter.

According to an aspect of the invention, there may be provided for a fluidic line LF passing through the portions 250, 251 and suitably dimensioned to allow the through-flow of air therein.

In the second sorting area 20, the fluidic line LF may be further superimposed to the advancement line LA of the mixture, as shown in FIG. 1.

More particularly, the portion 250 may comprise a first section LF1, while the portion 251 may comprise a second section LF2.

In the portion 250 there may be housed airflow generation means 21, for example in the form of a centrifuge fan 210, adapted to generate an air flow at a predetermined flow rate and pressure.

The latter may therefore be concentrated and directed to form an air blade through suitable air guides 211.

Therefore, the air blade may impact with the mixture to be sorted coming from the inlet 23.

Upon impact with the airflow, the mixture to be sorted may be divided based on the specific weight of the parts that form it.

As a matter of fact, the lighter parts may be cast farther than the point of incidence between the air blade and the mixture to be sorted, while the heavier parts may instead be subjected to a trajectory which will lead them to drop closer than the point of incidence.

Specifically, there may be provided for a plurality of conveyors 22 suitably sized and positioned to collect the various parts of separated sorted mixture by interacting with the air blade.

More particularly, the conveyors 22 may be positioned one with respect to the other so as to define a plane n.

The air blade may therefore be directed along a substantially incident direction with respect to the plane n.

The angle of incidence may therefore be optimised so as to guarantee the best sorting possible.

Preferably, the angle of incidence may for example be 20°.

However, it is clear that the angle of incidence may also be different, for example comprised between 0° and 45°, preferably 15° and 25°, without departing from the scope of protection of the attached claims.

Possibly, the conveyors 22 may also be selectively actuated, for example through suitable deflector actuations 221, so as to increase/reduce the collection surface of the aforementioned conveyors 22.

This will allow to act on the precision of the sorting step.

Furthermore, each conveyor 22 may be operatively connected with the outlet 24 of the second sorting area 20.

In this case, in output there may be a sorted mixture substantially solely formed by the pure part.

The outlet 24 may in turn be connected or at most coincide with the plurality of outlets OUT1, OUT2, . . . of the device 1.

In this latter case, each conveyor 22 may be operatively connected with the respective outlet of the device 1 so that—at each outlet—there is a fraction of pure part having the same size and specific weight, within predetermined tolerance ranges.

As a result of the interaction between the air blade and the mixture to be sorted, the air blade may be such to trap, through a suitable turbulent motion, the lighter particles of impure part contained within the mixture to be sorted, such as for example dust, particulate and the like.

The airflow containing the lighter particles of impure part may therefore me made to advance towards the portion 251 of the chamber 25 so as to be filtered.

To this end, the portion 251 may include suitable air filtering means 26 intended to receive—in input—the air flow to be filtered, or, in the specific case, to be depulverised.

In this manner, the first section LF1 of the fluidic line LF may therefore extend from the air flow generation means 21 up to the air filtering means 26.

The second section LF2 may instead extend from the latter 26 up to the air flow generation means 21.

According to an advantageous aspect of the invention, the first and the second section LF1, LF2 may be consecutive with respect to each other and define a mutually closed path for recovering air through the aforementioned air filtering means 26.

To this end, the portion 251 may provide for the presence of one or more airtight ducts 27 suitably configured and dimensioned to allow the through-flow of the filtered air by the filtering means 26 up to the air flow generation means 21.

This will allow to recover the air exiting from the portion 250 so as to filter it and use it again entering the portion 250.

It is therefore clear that such recirculation may occur without connection with the external environment and therefore neither providing for recovering air to be sent to the air flow generation means 21, nor a release of the filtered air by the filtering means 26 towards the atmosphere.

In other words, the path may be completely closed, that is the air recirculation may be total and completely within the device 1.

In this specific case, the fluidic line LF, and therefore the fluidic path, may be entirely without fluidic connections with the external environment.

This will allow to prevent air and/or dust and/or particulate emissions to the external.

Figure 4:
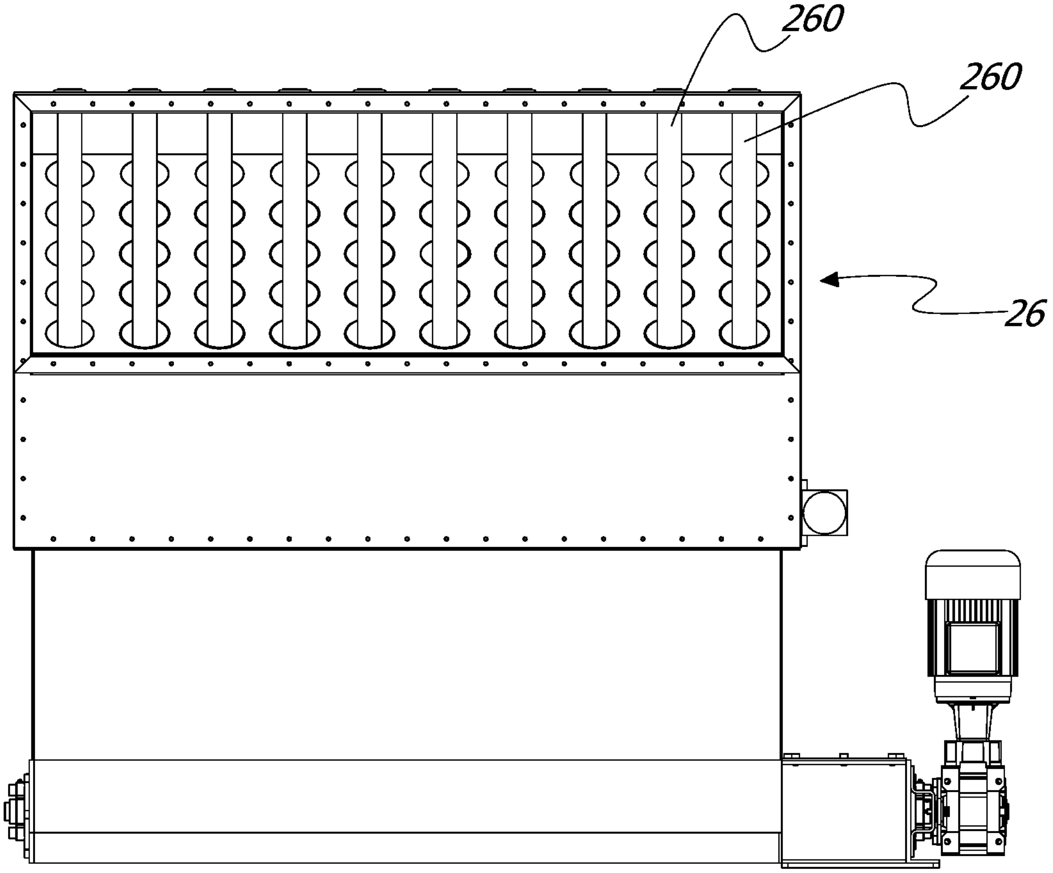
FIG. 4 shows a schematic view of the multi-cyclon filter 26.

In the specific case, the air filtering means 26 may be in the form of multi-cyclon filter 26 with a plurality of per se known cyclone filters 260, as shown in FIGS. 1, 2 and 4.

The latter may be suitably dimensioned and mutually spaced to depulvirise the entering air through a centrifuge action.

According to an advantageous aspect of the invention, each cyclone filter 260 may have a diameter comprised between 5 cm and 15 cm, preferably 5 cm and 12 cm.

As a matter of fact, such choice may allow to reduce the overall volumes of the multi-cyclon filter 26, as well as the device 1.

In a per se known manner, due to the centrifuge force, the particles may be separated from the air flow in which they are contained and they may spread on the wall of the cyclone filter 260.

Subsequently, the particles may be dragged—by gravity—towards the lower part of the cyclone filter 260, at which there may be collected, preferably through an airtight auger, and subsequently removed, for example by releasing towards the atmosphere.

Advantageously, the amount of dust removed from the air flow may be particularly small, actually thanks to the presence of the suctioning means described above.

Therefore, this may allow to fall within the limits provided for by the particulate emission regulations, the amount of particles emitted into the atmosphere being actually insignificant.

As a further advantageous aspect, the depulverised air may return—through the airtight ducts 27—to the centrifuge fan 210 and be used to generate the air blade as described above.

Air filtering may guarantee the recycling of the air exiting from the portion 250 without leading to significant pressure drops in the ducts.

From this point of view, the device 1 may be cost-effective, especially in work cycles that are particularly expensive and extended over time.

Preferably, the plurality of cyclone filters 260 may include a number of cyclone filters 260 comprised between 20-80, more preferably between 40-70, even more preferably 50.

In any case, the amount indicated regarding the number of cyclone filters 260 shall not be deemed to be limiting but solely depending on the size of the device 1.

In any case, the cyclone filters 260 may be divided so as to form a matrix of cyclone filters 260.

For example, according to a preferred but not exclusive embodiment, the cyclone filters 260 may be 50 and therefore divided into ten groups of five cyclone filters 260 each.

Such choice may be particularly effective for filtering air, in terms of filtering quality and quickness, as well as particularly adapted to reduce the overall dimensions of the multi-cyclon filter 26 and—by extension—of the device 1.

Possibly, there may also be provided for suitable shutter means 261 acting on a selection of the plurality of cyclone filters 260 to activate/deactivate them.

This will allow to modulate the air circulating within the fluidic line LF in the second sorting area 20 by activating/deactivating some cyclone filters 260.

Should the cyclone filters 260 be arranged in groups, the shutter means 261 may be configured to act on the latter, by activating/deactivating them selectively.

The shutter means 261 may for example be in the form of a bypass valve positioned on the hood of the multi-cyclon filter 26, as shown in FIG. 1.

According to a further advantageous aspect of the invention, the device 1 may also include control means 101 configured to selectively actuate the electrical parts of the machine 1.

The aforementioned electrical parts of the machine may include sifters 11, the air generation means 21, the conveyors 22, the air filtering means 26 to actuate them selectively.

More specifically, the control means 101 may be operatively connected with the centrifuge fan 210, the air guides 211, the multi-cyclon filter 260, the shutter means 261 and the deflector actuations 221 of the conveyors 22 to allow the selective actuation thereof.

To this end, the control means 101 may provide for the presence of a logic control unit 102, for example in the form of one or more PLCs, configured to command the selective actuation of the aforementioned electrical parts.

On the latter there may also be installed a suitable software for the management of the pre-sorting and sorting of the mixture.

Preferably, the control means 101 may also be positioned in the support structure 100 of the device 1.

According to a preferred but non-exclusive embodiment, the aforementioned control means 101 may actually be in the form of a per se known electric panel 101, preferably positioned in the support structure 100.

Besides the logic control unit 102, the latter may also include suitable protection and signalling devices, also per se known.

The electric panel 101 may be operatively connected using suitable wiring with all the aforementioned electrical parts of the device 1.

Advantageously, the choice of inserting the electric panel 101 into the support structure 100 may allow to significantly increase the inherent safety of the device 1, due to the absence of external wiring.

It may also allow to significantly reduce the costs and times required for the start and installation of the device 1.

According to a further advantageous aspect of the invention, the device 1 may provide for the presence of suitable unloading means MS positioned at the outlets OUT1, OUT2, . . . as shown in FIG. 3.

The latter may for example include a plurality of conveyor belts of the Redler type suitably dimensioned to move the pure part of the sorted mixture towards, for example, a designated storage area.

In the light of the above, the present invention attains the pre-established objects.

Furthermore, it is clear that the present invention may include various parts and/or similar or identical elements. Unless otherwise specified, similar or identical parts and/or elements will be indicated using a single reference number, it being clear that the described technical characteristics are common to all similar or identical parts and/or elements.

The invention is susceptible to modifications and variants, all falling within the scope of protection of the attached claims. All details can be replaced by other technically equivalent elements, and the materials can be different depending on the needs, without departing from the scope of protection of the invention defined by the attached claims.

The invention claimed is:

1. A device for sorting a mixture of solid loose products comprising a pure part and an impure part, the device comprising:

an inlet for the mixture to be sorted;

a first sorting area comprising a sifter configured to pre-sort the mixture to be sorted so as to reduce a presence of the impure part in the mixture;

a second sorting area subsequent to the first sorting area, comprising an airflow generation system and a plurality of conveyors, the airflow generation system being dimensioned to generate an airflow adapted to impact and direct the pre-sorted mixture into the plurality of conveyors so as to separate the pure part and the impure part;

a plurality of outlets for the sorted mixture, each of the plurality of outlets being operatively connected with a conveyor of the plurality of conveyors to dispense, in a differentiated manner, the pure part and the impure part; and a line configured to advance the mixture and extending in a continuous manner from the inlet to the plurality of outlets, passing through the first sorting area and the second sorting area, wherein the second sorting area further comprises an air filtering system, wherein the second sorting area includes an at least partially airtight chamber with a first portion comprising the airflow generation system and the plurality of conveyors, and a second portion comprising the air filtering system, further comprising a fluidic line for air which includes a first section extending from the airflow generation system to the air filtering system and the air filtering system, and a second section extending from the air filtering system to the airflow generation system, wherein the air filtering system includes a plurality of cyclone filters configured to filter the airflow generated by the airflow generation system, wherein the airflow generation system, the first section, the air filtering system, and the second section are consecutive with respect to each other so as that the fluidic line defines a closed path for recycling the air, the closed path being without fluidic connection with an external environment, the air recirculation being total and completely within the device, and wherein the second portion of the at least partially airtight chamber includes an airtight duct positioned along the second section of the fluidic line, the plurality of cyclone filters being configured to filter the air flowing out from the first portion of the at least partially airtight chamber.

2. The device according to claim 1, wherein the airtight duct allows a through-flow of the filtered air by the filtering system including the plurality of cyclone filters up to the air flow generation system.

3. The device according to claim 1, wherein each of the cyclone filters in the plurality of cyclone filters has a diameter comprised between 5 cm and 15 cm.

4. The device according to claim 1, wherein the plurality of cyclone filters includes a number of cyclone filters comprised between 20-80.

5. The device according to claim 1, wherein the air filtering system further includes a shutter acting on a selection of the plurality of cyclone filters so as to modulate an overall flow rate of the air circulating in the fluidic line.

6. The device according to claim 1, further comprising:

a first vibrating system positioned at the inlet to move the mixture toward the inlet of the first sorting area along the advancement line; and a second vibrating system positioned at an outlet of the first sorting area to convey the pre-sorted mixture towards an inlet of the second sorting area along the advancement line.

7. The device according to claim 1, wherein the first sorting area comprises a plurality of sifters positioned in series or parallel.

8. The device according to claim 1, further comprising an unloading system of the sorted mixture arranged at the plurality of outlets, the unloading system comprising a plurality of conveyor belts each positioned at each one of the plurality of outlets.

9. The device according to claim 1, further comprising a closed support structure and a control system positioned inside the closed support structure, the control system being operatively connected at least with the sifter, the airflow generation system, the plurality of conveyors, and the air filtering system to selectively command an actuation thereof.

* * * * *